United States Patent [19]

Storz et al.

[11] Patent Number: 5,593,125
[45] Date of Patent: Jan. 14, 1997

[54] WINDSHIELD WIPER ASSEMBLY FASTENING ARRANGEMENT

[75] Inventors: Andreas Storz, Boeblingen; Siegmund Czesnikowski, Unterjettingen; Wolfram Frey, Altehengstett, all of Germany

[73] Assignee: Mercedes-Benz AG, Germany

[21] Appl. No.: 421,933

[22] Filed: Apr. 14, 1995

[30] Foreign Application Priority Data

Apr. 20, 1994 [DE] Germany ............ 44 13 635.8

[51] Int. Cl.[6] ............................................. B60S 1/34
[52] U.S. Cl. ............... 248/316.5; 248/74.2; 248/230.4; 248/231.51; 15/250.31
[58] Field of Search ............... 248/316.5, 316.1, 248/74.2, 230.4, 231.51; 15/250.30, 250.31, 250.34, 250.351, 250.352; 296/96.15

[56] References Cited

U.S. PATENT DOCUMENTS

| | | | |
|---|---|---|---|
| 1,688,847 | 10/1928 | Aufiero | 15/250.30 X |
| 2,091,390 | 8/1937 | Forman | 15/250.30 X |
| 2,297,900 | 10/1942 | Lee | 15/250.30 X |
| 2,965,411 | 12/1960 | Makela | 15/250.31 X |
| 2,997,727 | 8/1961 | Ziegler | 15/250.34 |
| 3,606,629 | 9/1971 | Parker | 15/250.30 X |
| 4,509,878 | 4/1985 | Bryson et al. | 248/27.1 X |
| 4,609,171 | 9/1986 | Matsui | 248/316.1 X |
| 4,625,359 | 12/1986 | Egner-walter et al. | 15/250.21 |
| 5,203,602 | 4/1993 | Eustache | 296/96.15 |
| 5,305,978 | 4/1994 | Current | 248/230.4 |
| 5,396,681 | 3/1995 | Hara | 15/250.31 |
| 5,408,719 | 4/1995 | DeRees et al. | 15/250.23 |

FOREIGN PATENT DOCUMENTS

| | | | |
|---|---|---|---|
| 2413620 | 9/1975 | Germany | 15/250.34 |
| 2806351 | 6/1979 | Germany | B60S 1/02 |
| 8812550.5 | 1/1989 | Germany | B60S 1/16 |
| 669730 | 4/1952 | United Kingdom | 15/250.30 |
| 2142376 | 1/1985 | United Kingdom | 248/74.2 |
| 2258146 | 2/1993 | United Kingdom | 15/250.30 |

*Primary Examiner*—Alvin C. Chin-Shue
*Assistant Examiner*—Brian J. Hamilla
*Attorney, Agent, or Firm*—Evenson, McKeown, Edwards & Lenahan P.L.L.C.

[57] ABSTRACT

Fastening device for a stroke-type windshield wiper assembly on passenger vehicles in which a once adjusted position of the windshield wiper assembly can also be maintained during a repeated mounting and demounting. The holding element comprises two hingedly connected half shells which reach around the holding part of the wiper assembly. A first half shell is rigidly arranged on the holding element, and the other second half shell is releasably and lockably held on the first half shell, using a detent lock arrangement.

14 Claims, 2 Drawing Sheets

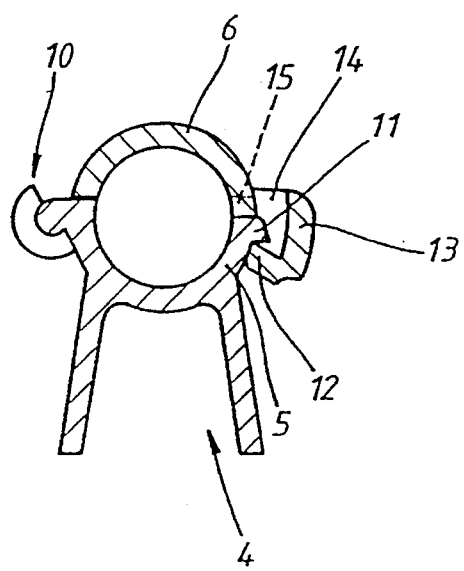
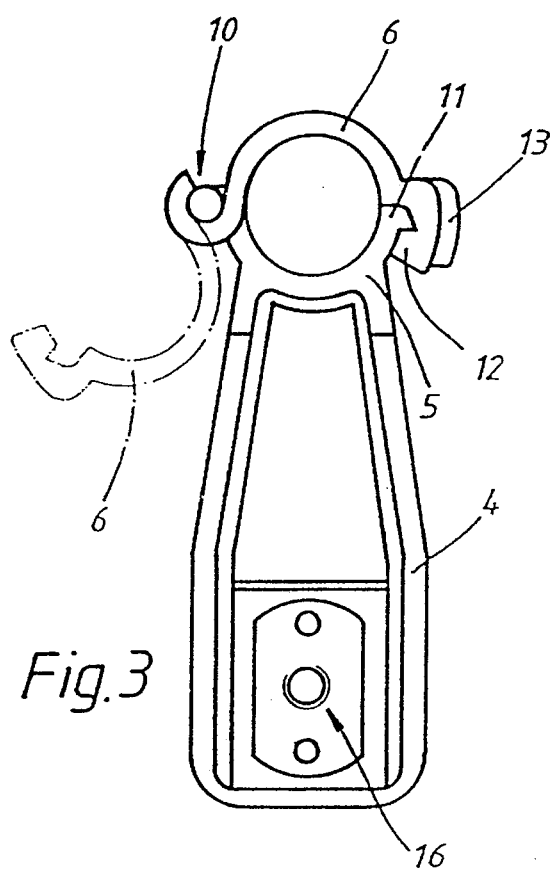
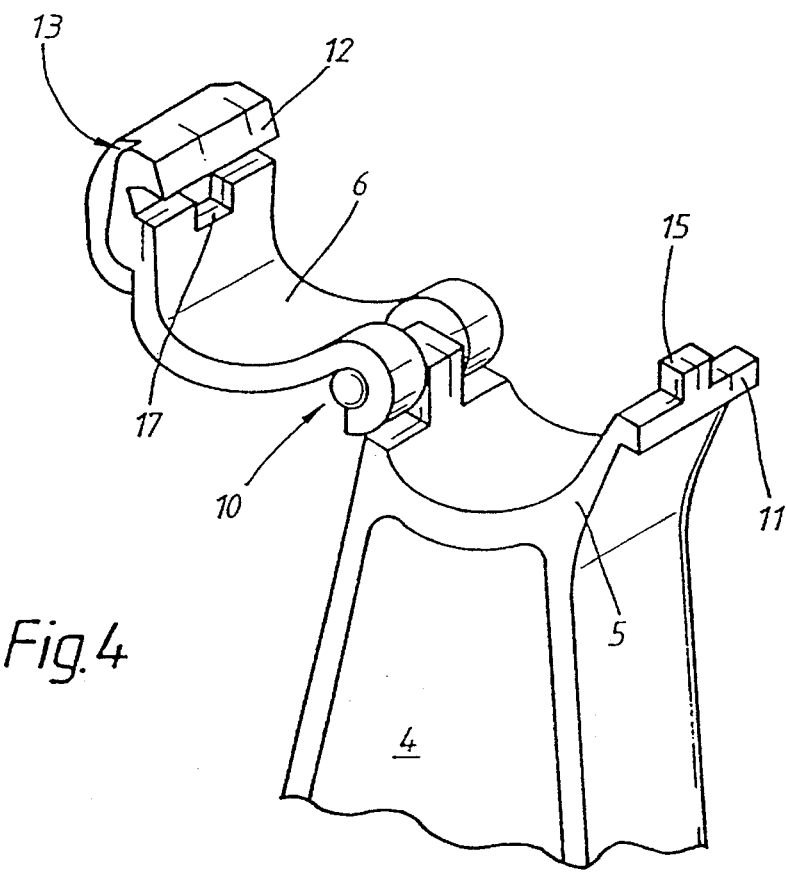

WINDSHIELD WIPER ASSEMBLY FASTENING ARRANGEMENT

BACKGROUND AND SUMMARY OF THE INVENTION

The present invention relates to a fastening arrangement for a windshield wiper assembly with two lateral fastening points as well as a central adjustable holding element which can be mounted on a supporting wall fixed to the vehicle and, in the mounted condition, secures a holding part of the windshield wiper assembly.

In known windshield wiper assemblies in passenger cars (e.g. Mercedes-Benz W 124), a central stroke-type windshield wiper is provided below the windshield. During the mounting, the wiper assembly is first fixedly connected on both sides on its lateral fastening points with the supporting wall of the passenger car in front of the windshield. Subsequently, a central holding element for the wiper assembly, which is connected with a holding part, is mounted on the supporting wall. Consequently, the holding element must be adjusted on the supporting wall for a precise positioning of the windshield wiper assembly. In the case of a removal and new installation of the windshield wiper assembly, the holding element must be demounted. When it is again mounted, the holding element must be adjusted, and this adjustment results in high expenditures.

DE-AS 28 06 351 shows a windshield wiper arrangement which can be mounted in front of a windshield of a motor vehicle. The entire windshield wiper assembly is fastened to a supporting element made of a fiber-reinforced plastic material forming an outside body panelling part. The supporting element has an engine console on which the wiper motor is fastened by screws.

DE 88 12 550 U1 describes a windshield wiper assembly for motor vehicles. Two windshield wiper arms are held on a rigid supporting structure connected with the motor vehicle body. The supporting structure is constructed as a one-piece rigid component which can be fastened on the body side. This component has a bar-type design with a central supporting plate, and also has two bush-shaped receiving devices for the bearing pins of the wiper arms.

It is an object of the present invention to provide an improved fastening arrangement by way of which a simple mounting and demounting of the windshield wiper assembly can be carried out without any high-cost adjustments.

This object has been achieved in accordance with the present invention by providing that the holding element comprises two half shells which reach around the holding part of the wiper assembly, of which a first half shell is rigidly arranged on the holding element and the other, second half shell is releasably held on the first half shell. Because the holding part of the wiper assembly is embedded between the two half shells, the wiper assembly can be removed after the removal of the upper, second half shell and the releasing of the lateral fastening points, without having to release the adjusted holding element from the supporting wall. When the wiper assembly is installed again, it will therefore be set again in the already precisely adjusted position in that, in a simple manner, the holding part is placed in the rigid, lower half shell and the second, upper half shell is then placed on it for the fixing.

According to a further aspect of the present invention, the second half shell is swivellably held on the first half shell and can be locked in a closed position by a detent locking device. This ensures an easily releasable connection of the second half shell on the first half shell without any additional fixing elements.

Still another feature of the present invention includes the detent locking device having a securing nose which axially and form-lockingly secures the second half shell. This feature avoids a lateral displacement of the movable, second half shell.

In yet a further aspect of the present invention, the second half shell is provided with a tool receiving device for the application of a tool for opening the detent locking device so as to simplify the opening of the detent locking device.

BRIEF DESCRIPTION OF THE DRAWINGS

These and other objects, features and advantages of the present invention will become more readily apparent from the following detailed description thereof when taken in conjunction with the accompanying drawings wherein:

FIG. 2 a sectional view of the upper part of the holding element along line II–II in FIG. 1;

FIG. 3 is a front view of the holding element of FIG. 1; and

FIG. 4 is a perspective view of the upper part of the holding element of FIG. 3, in which case the movable, second half shell is illustrated in its swivelled-open condition.

DETAILED DESCRIPTION OF THE DRAWINGS

Figure 1:
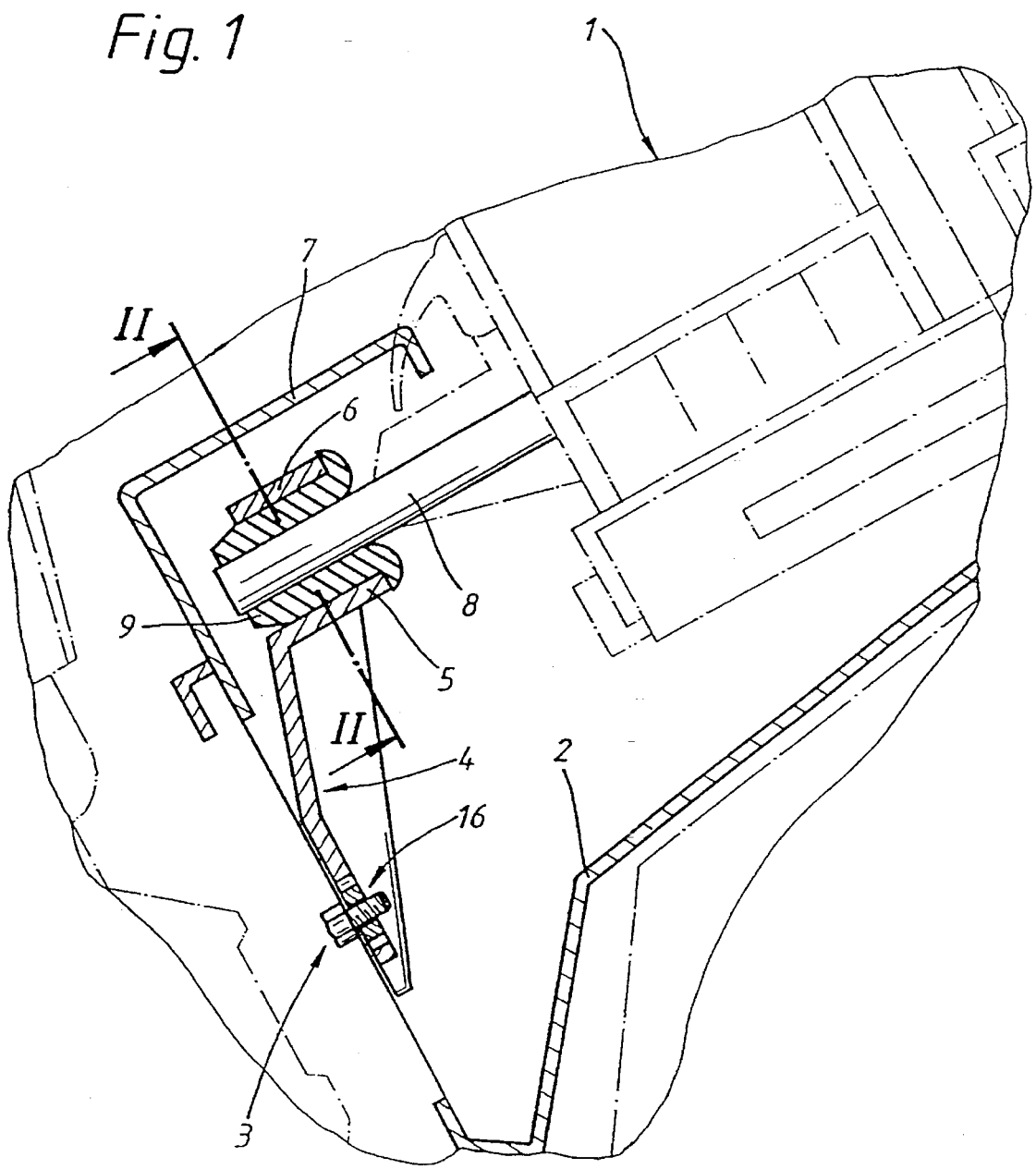
FIG. 1 is a longitudinal side sectional view of the area of an embodiment of a fastening arrangement for a windshield wiper assembly according to the present invention, in which a holding element for adjusting the wiper assembly is connected with a supporting wall fixed to the vehicle body.

In a passenger car, a windshield wiper assembly designated generally by numeral 1 is arranged in front of and below a windshield. The windshield wiper assembly 1 comprises a stroke-type windshield wiper and is arranged at the level of a longitudinal center axis of the passenger car centrally in front of the windshield. For fastening the windshield wiper assembly 1 on a vehicle supporting wall 2, the windshield wiper assembly 1 is provided with two lateral fastening points which are fixedly connected with corresponding fastening parts of the supporting wall 2.

In order to be able to fix the windshield wiper assembly 1 in a precise position which permits a perfect operation of the windshield wiper assembly 1, the fastening arrangement for the windshield wiper assembly 1 also has a central holding element designated generally by numeral 4 which is arranged at the level of the longitudinal center axis of the passenger car. The windshield wiper assembly 1 comprises a sheet bar lengthened portion 8 which projects against the windshield toward the front and downward, serves as a holding part and has a rubber bushing 9 pushed on the free end thereof. This rubber bushing 9 is pushed into a receiving device between two half shells 5, 6 of the holding element 4 so that the holding element 4 is fixedly connected with the sheet bar lengthened portion 8.

The holding element 4 projects from the sheet bar lengthened portion 8 approximately radially downwardly and has at its lower end an adjusting device 3 which can be rigidly connected with a portion of the supporting wall 2. In the area of the adjusting device 3, a counterplate 16 can be engaged with an adjusting screw which is displaceable in an oblong hole. Of course, other adjusting devices may also be used by way of which a desired position of the holding element 4 and thus of the windshield wiper assembly 1 can be adjusted and fixed. The area of the holding element 4 is covered by a cover panel 7 toward the outside.

As illustrated in FIGS. 2 to 4, a first half shell 5 of the two half shells 5, 6, which form the receiving device for the sheet bar lengthened portion 8, is a one-piece part of the basic body of the holding element 4. The holding element 4 is made of plastic material. In contrast, the second, upper half shell 6, on one side, is disposed on the lower, first half shell 5 so that it can be swivelled by a hinge 10. On the opposite side, a detent locking device 11, 12 is provided by way of which the upper half shell 6 can be locked on the lower half shell 5 in the closed position forming the receiving device. For this purpose, the upper half shell 6 has a detent 12 and the lower half shell 11 has a corresponding detent 11. Above the area of the detent 12, the upper half shell 6 also has a pocket-type tool receives in the form of an opening 14 into which a screw driver can be pushed. The tool receiving opening 14 is formed by a receiving area 13 in the upper half shell 6. The material of the half shell 6, which encloses the pocket-type tool receiving opening 14, therefore forms the receiving area 13 in the form of a hump. This permits the release of the detent lock in a simple manner in that, after the insertion of the screw driver, the screw driver is tilted and the detent 12 of the upper half shell 6, which reaches behind the detent 11, is bent to the outside and is therefore disengaged. The half shell 6 can now be swung open in a simple manner into the position indicated in FIGS. 3 and 4.

In order to avoid a lateral displacement of the half shell 6 relative to the lower half shell 5, a form-locking securing device is provided in the form of a securing nose 15 which projects upward from the lower half shell 5 and which engages in a corresponding indentation 17 constructed in the upper half shell 6 as soon as the two half shells 5, 6 are in their closed position.

After the swivelling-open of the upper half shell 6, the sheet bar lengthened portion 8 including the rubber bushing 9 can be inserted for mounting and subsequently the upper half shell 6 can be swivelled into the closed position. For demounting, after the lateral fastening points are released and the upper half shell 6 is swivelled open, the windshield wiper assembly 1 can be removed in a simple manner. The holding element 4 thus remains in its adjusted position so that an adjustment of the windshield wiper assembly 1 is required only once even if it is removed and installed several times.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An arrangement, comprising a windshield wiper assembly, a fixed supporting wall, a central adjustable holding element having a lower extending portion operatively mounted on the fixed supporting wall to secure, in a mounted condition, a holding part of the windshield wiper assembly, wherein the holding element includes two hingedly joined half shells which are adapted to reach around the holding part of the wiper assembly, a first of the half shells having the lower extending portion mounted at the fixed supporting wall and being rigidly arranged on the holding element, and the second of the half shells being releasably and lockably held on the first half shell.

2. The arrangement according to claim 1, wherein each of the half shells have an arcuate shape configured to match an outer arcuate shape of the holding part.

3. An arrangement, comprising a windshield wiper assembly, a fixed supporting wall, a central adjustable holding element having a lower extending portion operatively mounted on the fixed supporting wall to secure, in a mounted condition, a holding part of the windshield wiper assembly, wherein the holding element includes two half shells which are adapted to reach around the holding part of the wiper assembly, a first of the half shells having the lower extending portion mounted at the fixed supporting wall and being rigidly arranged on the holding element, and the second of the half shells being releasably held on the first half shell, wherein the second half shell is swivellably held on the first half shell and is provided with a detent lock so as to be locked in a closed position.

4. The according to claim 3, wherein the detent lock has a securing nose axially and form-lockingly securing the second half shell.

5. The fastening arrangement according to claim 3, wherein a hinge is provided to dispose one side of the second half shell on the first half shell, and the detent lock is constituted by an opposite side of the second half shell being configured to reach behind a detent on the first half shell.

6. The arrangement according to claim 5, wherein the detent lock has a securing nose axially and form-lockingly securing the second half shell.

7. The arrangement according to claim 4, wherein the first half shell has an upwardly projecting securing nose, and the second half shell has a cooperating indentation.

8. The arrangement according to claim 3, wherein the second half shell has a tool receiver for applying a tool to open the detent lock.

9. The arrangement according to claim 8, wherein the detent lock has a securing nose axially and form-lockingly securing the second half shell.

10. The arrangement according to claim 9, wherein a hinge is provided to dispose one side of the second half shell on the first half shell, and the detent lock is constituted by an opposite side of the second half shell being configured to reach behind a detent on the first half shelf.

11. The arrangement according to claim 10, wherein the first half shell has an upwardly projecting securing nose, and the second half shell has a cooperating indentation.

12. A method of using a fastening arrangement for a windshield wiper assembly with a holding part in a vehicle, wherein the arrangement comprises a central adjustable holding element having two hingedly connected half shells configured to reach around the holding part in a closed position of the half shells, with one of the half shells being releasably and lockably connected with the other of the half shells in the closed position, comprising the steps of (a) mounting the other of the half shells on a supporting wall of the vehicle;

(b) placing the holding part of the windshield wiper assembly between the half shells in an open position; and (c) pivoting the one half shell to the closed position to securely hold the holding part between the half shells which are now releasably and lockably connected, wherein steps (b) and (c) can take place before or after step (a).

13. The method according to claim 12, wherein the one half shell is detent locked in the closed position.

14. The method according to claim 13, wherein the detent locking is effected by a securing nose of the other half shell axially and form-lockingly engaging the one half shell.

* * * * *